No. 646,989. Patented Apr. 10, 1900.
W. C. HOOKER.
ANIMAL TRAP.
(Application filed Dec. 14, 1899.)
(No Model.)
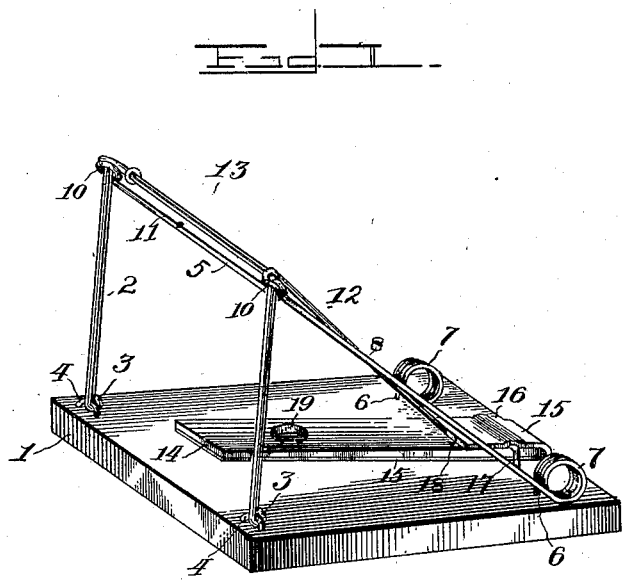
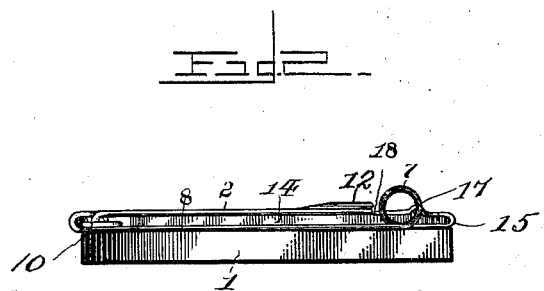
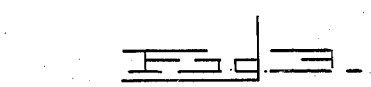
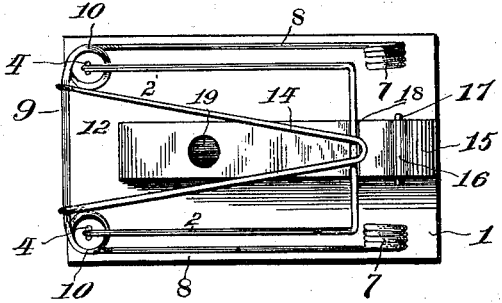
Witnesses
William C Hooker Inventor
By his Attorneys,

UNITED STATES PATENT OFFICE.

WILLIAM C. HOOKER, OF ABINGDON, ILLINOIS.

ANIMAL-TRAP.

SPECIFICATION forming part of Letters Patent No. 646,989, dated April 10, 1900.

Application filed December 14, 1899. Serial No. 740,319. (No model.)

*To all whom it may concern:*

Be it known that I, WILLIAM C. HOOKER, a citizen of the United States, residing at Abingdon, in the county of Knox and State of Illinois, have invented a new and useful Animal-Trap, of which the following is a specification.

This invention relates to animal-traps of that class in which the animal is caught by a spring-actuated jaw sprung by the action of the animal and operating to snap shut and catch the animal between the jaw and the base of the trap; and one object in view is to provide a simple and effective trap which may be easily set and wherein the parts will not become deranged in use and operable by the entrance of the animal thereinto from either side or at the front and wherefrom the animal may be readily removed and avoid the use of barbs or other penetrating devices.

Other objects and advantages will appear in the subjoined description and also be hereinafter set forth in the claim in the form of a novel combination of elements, and the preferred embodiment of the invention is illustrated in the accompanying drawings, wherein—

Figure 1 is a perspective view of a trap embodying the features of the invention and shown set. Fig. 2 is a side elevation of the improved trap in unset position. Fig. 3 is a top plan view of the trap in unset position.

Similar numerals of reference are employed to indicate corresponding parts in the several views.

The numeral 1 designates a base, which may be of any suitable dimension and preferably constructed of some light material, such as wood, though other materials may be used, if desired. Adjacent one end of the base 1 a movable setting-jaw 2 is applied and has its terminals 3 loosely connected to staples or eyes 4, secured in the base, the said jaw being of substantial U-shaped form and coacts with a spring gripping-jaw 5 and comprising terminals 6, secured in the base 1 near the rear end of the latter and provided with coils 7, from the outer portion of each of which an arm 8 extends forwardly, both arms being continued into a transverse connector 9. At the junction of the arms 8 and connector 9 a coil 10 is provided on each side and loosely plays or moves over the opposite side members of the movable setting-jaw 2, the said coils thereby serving as guides to maintain a constant operable relation between the jaws 2 and 5, and on the center of the connector 9 is movably mounted a setting-trigger 12, the said trigger being in the form of a substantial V-shaped loop and adapted to pass over the central portion of the transverse member of the jaw 2 and bear on the latter as effective means of maintaining the parts of the trap in set position and in connection with other devices, which will be now described.

A treadle 14 is hinged to the base 1 and has thereon a metallic sheathing or covering 15, which extends over the rear end and a portion of the rear top surface and full length under the bottom, the part of said sheathing that is located over the rear end of the treadle and slightly in advance of the rear terminal of the latter having a transverse upwardly-extending bend 16 to provide a seat for the horizontal member of a staple or analogous device 17, which has its terminals fast in the base 1. By this means the treadle 14 is free to move within predetermined limits, the upward movement of the treadle being restricted beyond a certain extent by the rear end striking against the base 1, as clearly shown in Fig. 1, in view of the location of the staple or analogous device 17. The terminal of the sheathing 15 at the rear of the upper portion of the treadle 14 provides an abutment 18, against which the reduced end of the trigger 12 is brought to bear in setting the trap, and by this means the said treadle is held up in the position shown in Fig. 1, and the trap is maintained in set condition until the trigger is released by a depression of the treadle. Near the front terminal of the treadle 14 an opening 19 is formed therethrough to provide a bait-seat, the sheathing 15 serving as a bottom for the said seat.

The improved trap is to be made in different sizes and used not only for capturing rats and mice, but also squirrels, gophers, and the like, and is adapted to be placed upon shelves or within the entrance or exit of holes or in runways, and in use for rats or mice the rear portion may be covered by a piece of paper or cloth when set with the front end to the wall, leaving the runway next to the wall and through the trap. In adapting the trap for use in catching animals larger than rats and mice the parts will be proportionately increased in dimension, and it will be observed that the trap when in unset condition is compact in form and will occupy but a very small space, and, furthermore, it is simple and cheap in the cost of manufacture.
The trap in set condition appears as shown in Fig. 1, with the bait located in the seat 19, and it will be observed that the animal is permitted to approach the same from either side or at the front, and a pressure on the treadle 14 will lower the latter and break the contact of the rear terminal of the trigger 12 with the abutment 18, and thereby release the gripping-jaw 5, which will be immediately forced toward the base 1 and simultaneously draw the setting-jaw 2 downwardly therewith and firmly bind upon the animal, such operation being carried on so rapidly that it will be impossible for the animal to withdraw from the trap before being caught.
Changes in the form, proportions, and minor details of construction may be resorted to without departing from the principle or sacrificing any of the advantages of the invention. One of these changes that obviously suggests itself is the formation of the trigger in a single piece or of a single wire instead of the looped construction shown and described.

Having thus described the invention, what is claimed as new is—

In an animal-trap, the combination of a base, a treadle movably attached thereto and having an upper rear abutment and a bait-seat, a spring-actuated gripping-jaw having coils at the opposite corner portions of its free end, a loosely-mounted setting-jaw having its opposite side members located in and movable through the coils of the gripping-jaw and its closed end extending across the plane of the free end of said gripping-jaw, whereby the said loosely-mounted setting-jaw is raised simultaneously with and by the elevation of the gripping-jaw, and a trigger loosely attached to the free end of the said spring-jaw and adapted to bear on the closed end of the movable setting-jaw and to have its rear terminal contact with the abutment of the treadle when the trap is set.

In testimony that I claim the foregoing as my own I have hereto affixed my signature in the presence of two witnesses.

WILLIAM C. HOOKER.

Witnesses:
W. T. WALLACE,
KNOX R. MARKS.